United States Patent [19]
Jansen

[11] Patent Number: 5,867,383
[45] Date of Patent: Feb. 2, 1999

[54] PROGRAMMABLE LOGIC CONTROLLER

[75] Inventor: Abraham J. A. M. Jansen, Eindhoven, Netherlands

[73] Assignee: Nyquist BV, Netherlands

[21] Appl. No.: 722,650

[22] Filed: Sep. 30, 1996

[30] Foreign Application Priority Data

Sep. 29, 1995 [BE] Belgium ............................... 09500812

[51] Int. Cl.⁶ ..................................... G06F 19/00
[52] U.S. Cl. ...................... 364/146; 364/140.02; 395/677
[58] Field of Search ..................... 364/140, 141,
364/146, 147, 140.02, 140.03, 140.06, 140.07;
395/670, 672, 673, 674, 675, 677, 678,
826, 827, 840, 841, 865, 878, 556, 557,
559; 370/468

[56] References Cited

U.S. PATENT DOCUMENTS 3,573,852  4/1971  Watson et al. ........................ 395/677
4,178,634  12/1979 Bartlett ................................... 364/130
4,897,834  1/1990  Peterson et al. ....................... 370/432
5,193,189  3/1993  Flood et al. ...................... 364/140 X

*Primary Examiner*—Joseph Ruggiero
*Attorney, Agent, or Firm*—Armstrong, Teasdale, Schlafly & Davis

[57] ABSTRACT

In a programmable logic controller data is exchanged between a data communication section and a sequential control section. Within the sequential control section a communication task is activated for a given period during each PLC cycle. Subsequently, inter alia a user task is activated; this user task controls a machine or a process inter alia on the basis of the data exchanged. By making the ratio of the period in which the communication task is active to that in which the user task is active adjustable, very time-critical processes with a very short response time can be controlled as well as large amounts of data can be exchanged in few PLC cycles during less time-critical phases of operation of the machine or process to be controlled.

16 Claims, 3 Drawing Sheets

PROGRAMMABLE LOGIC CONTROLLER

The invention relates to a programmable logic controller (PLC), comprising a processor unit for sequential control of a process and for data communication with at least one external system, which PLC is arranged to execute tasks cyclically during sequential control.

Generally speaking, a PLC is a (micro)processor or a system of (micro)processors for the execution of a specific task, for example the monitoring and control of a process. Such a process may be the control of a machine as well as of a complex of collaborating installations. For correct operation it is necessary to execute a number of tasks while responding to signals originating from the process or system to be controlled and to control parameters from, for example a user console. The various tasks to be executed in a PLC are carried out in a fixed order; during a cycle (to be referred to hereinafter as the PLC cycle) a given amount of time is made available to each of said tasks, The tasks in a typical PLC cycle are: general overhead, required for correct operation of the programmable logic controller; writing of data, for example signals from the system controlled; execution of the user task, i.e. the processing of the signals entered so as to form control signals for the system; output of the control signals; external communication, for example with an operator console and/or a central computer. The length of the period assigned to each task is fixed, so that the total cycle time is fixed and hence also the total response time (TRT) of the programmable logic controller. The total response time is the time elapsing between the instant at which the value of one of the input signals changes and the instant at which this change influences the outgoing control signals.

Moreover, the PLC should communicate with an external system, for example a user console, in which case it is necessary not only to write control parameters of the external system but also to check these parameters for mutual consistency and consistency as regards the instantaneous state of the process or system to be controlled. After completion of this check and adaptation of the parameters, if necessary, during the execution of the communication task the new values must be transferred to the part of the processor which can be accessed by the user program.

In a conventional system as described above, the TRT may be subject to fluctuations because the number of operations to be carried out during the user or communication task may vary, for example in dependence on the values or the changes of the input signals and/or control parameters to be taken over. For example, it may occur that the communication time of several PLC cycles is required so as to take over a completely new set of control parameters. Consequently, much time is spent on the execution of the application program without the new parameters being (fully) taken into account. During this period a number of PLC cycles elapse without useful control being performed, leading to a serious increase of the response time of the system. If, in order to avoid this situation, the communication time is fixed as the maximum time required to take over the parameters, it will often occur that this time is not completely necessary, so that many PLC cycles have an idle period in which no task whatsoever is performed. This also slows down the operation of the PLC.

It is inter alia an object of the invention to provide a programmable logic controller in which the duration of the PLC cycle amounts to at the most a time desired by the user, in which idle time in a cycle can be simply avoided and the execution of cycles which are useless with respect to control can be reduced.

To achieve this, a PLC in accordance with the invention has the property that in each cycle a given period of time is available to each task, said tasks comprising a user task for executing an application program and a communication task for taking over control parameters for the application program which have been acquired during data communication with the at least one external system, the ratio of the durations of the periods available to the execution of the communication task and the application program being adjustable during the execution of the application program. In situations where it is expected that the user task will require a large amount of time or where interruptions of the user task must be minimized, for example during a time-critical phase of the operation of a machine, the time for the communication task is adjusted to a low value. In cases where a change of the control parameters can be executed without seriously disturbing the process, the time for the user task may be comparatively shorter and that for the communication task comparatively longer. In a non-critical phase of the process or machine control, this aspect is not detrimental to the system being controlled, so that the increase of the total response time is not objectionable. In comparison with a system in which switching over to a system task must wait until even a prolonged user task has been completely executed, a PLC in accordance with the invention offers the advantage that the cycle time variation is predetermined and is long only in specific circumstances as desired by the user.

In a preferred embodiment of the PLC in accordance with the invention the duration of the period available to the communication task can be adjusted via the application program. This is advantageous because in the application program it is known whether the controlled system or process is in a time-critical phase or not and when a large amount of new data is to be expected. This aspect is taken into account in the allocation of the communication time.

In an embodiment of the invention the period available to the communication task is adjustable within predetermined limits. If the communication time has a minimum value unequal to zero and is also bound to a maximum, the communication task as well as the user task is activated in each cycle. It is thus ensured that, via the communication task, the user program can always be influenced from the external system.

In a further embodiment of the invention the processor (CPU) comprises a first processor (SCP) for sequential control and a second processor (DCP) for data communication with the at least one external system, and a communication unit (MBX) for communication between the first and the second processor. Using two, task-specific processors in the PLC, the data communication with external systems and the control of the controlled system are executed in parallel. This means an acceleration of the sequential control of the controlled system.

These and other aspects of the invention will be apparent from and elucidated with reference to the embodiments described hereinafter.

Figure 1:
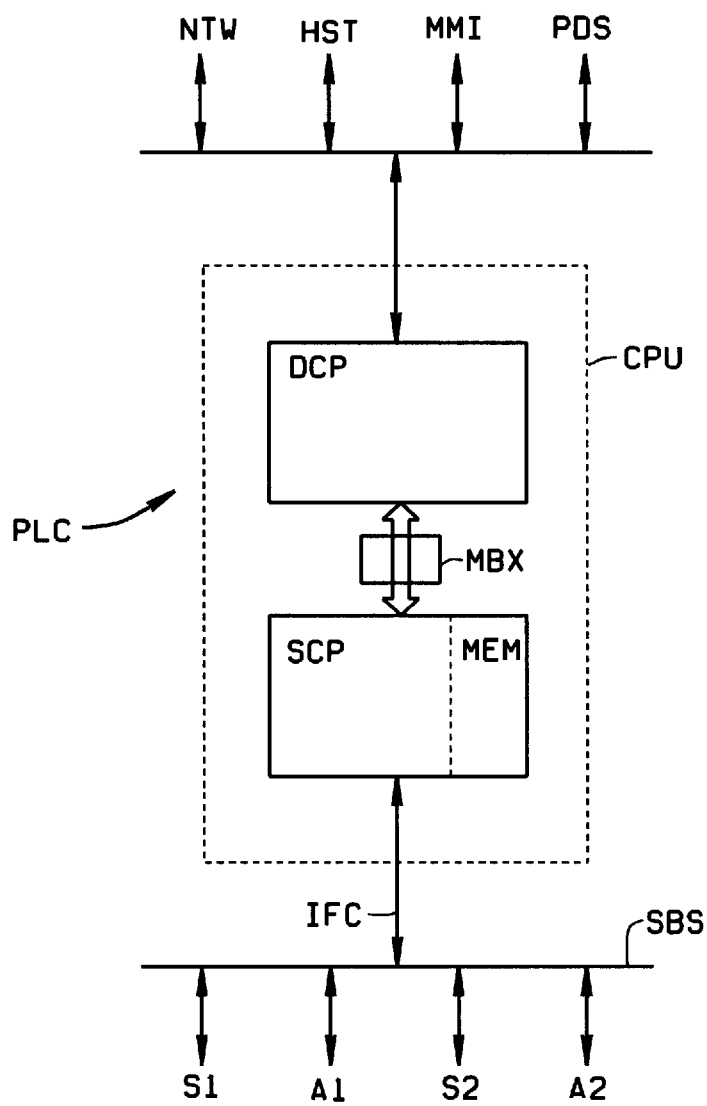
FIG. 1 shows a block diagram of a PLC with components of a system to be controlled which are coupled thereto.

The block diagram of FIG. 1 shows a programmable logic controller PLC which is coupled, for example via a serial bus SBS, to a number of sensors S1, S2, . . . whereby signals of a system to be controlled (not shown) are measured and entered into the programmable logic controller PLC. The programmable logic controller PLC is also coupled to actuators A1, A2, . . . , for example via the same serial bus SBS, in order to apply control signals for the system to be controlled thereto. Besides a single bus SBS, separate buses for input signals and control signals are also feasible. Apart from coupling to the serial bus SBS, with which the programmable logic controller is coupled to the controlled system, the controller is also coupled to one or more external systems. Shown are, by way of example, a user console or man-machine interface MMI for entering instructions and displaying the state of the controlled system and the logic controller, a programming and debugging system PDS for programming and testing the controller, an external computer system HST, and a connection to other logic controllers via a network NTW.

The programmable logic controller PLC comprises a central processor unit CPU with one or more storage modules and an interface module IFC to the serial bus or buses SBS. The storage modules contain inter alia a system program and an application program. The processor unit CPU can be subdivided into a section SCP which performs the sequential control of the controlled system, via sensors and actuators, and a section DCP which handles the data communication with the external systems NTW, HST, MMI and PDS. The latter section not only reads the parameters presented by the various external systems, but also checks these parameters for mutual consistency and solves conflicts, if any.

Figure 2A:
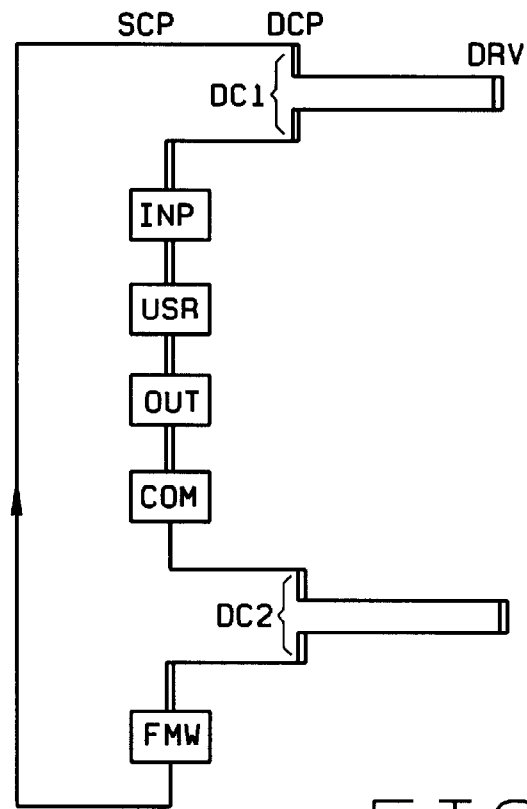
FIGS. 2a and 2b show the various types of tasks in a PLC cycle.
Figure 2B:
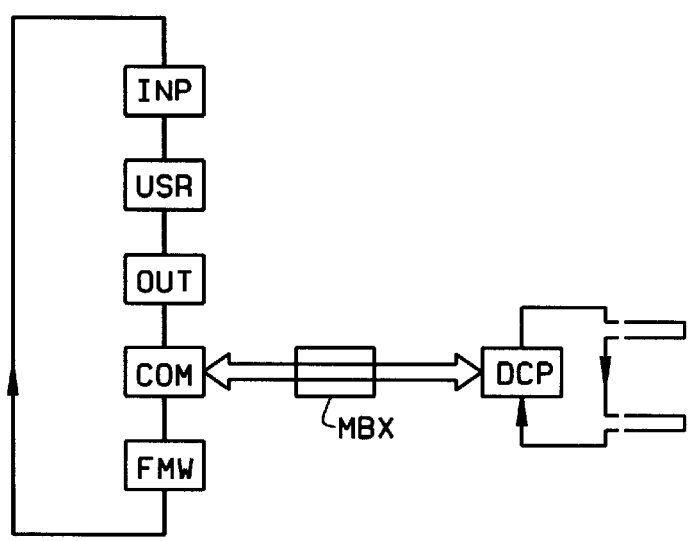

FIGS. 2a and 2b diagrammatically illustrate the execution of the tasks during a PLC cycle. FIG. 2a shows the execution of the tasks in case one processor is available which executes process control as well as data communication with external systems. FIG. 2b shows the execution of the tasks for process control if a separate processor is available for data communication. The sections DC1 and DC2 in FIG. 2a indicate when the processor exchanges data with external systems for the entering and execution of parameters, respectively. To this end, a driver DRV is activated from time to time. Furthermore, the parameters are checked and written into the appropriate storage locations in the logic controller. When the controller executes the blocks INP, USR, OUT, COM and FMW, the sequential control tasks are performed. During the block INP, analog and digital signals from the sensors are read; the block USR indicates that this information is processed in conformity with the instructions in the application program. Upon execution of the block OUT, calculated control signals are applied to the actuators. During the block COM, data is exchanged between the sequential control task and the data communication task. During this task data blocks are exchanged between the section dedicated to control and the section dedicated to data communication, for example by writing and reading in a memory accessible to both tasks. This exchange cannot take place continuously, because the sets of control parameters whereto the application program reacts would then be inconsistent. Finally, in the block FMW a so-called firmware program governs the internal processing of the controller. The firmware program ensures that commands entered via the parameters are executed in program blocks during the data communication task in as far as permitted by the allocated time. This is realized, for example via a look-up table stating for each command or program block how much time is required for the execution thereof. If not all commands can be executed within a PLC cycle, the other commands are postponed until the next cycle. Thus, the execution of the various commands is not interrupted when the allocated time is exceeded.

FIG. 2b shows the same for a system comprising two processors. In the left-hand part of the Figure the tasks INP, USR, OUT, COM and FMW of the sequential control processor are given. The right-hand part of the Figure shows that the data communication task with excursions to drivers DRV.

In a situation involving one processor, the change induced in the time allocation of the communication task by the application program will relate mainly to the communication with external units such as the operator console or central computer. This is the part of the PLC cycle which is denoted by the reference DCP in FIG. 2a. When two processors are involved, notably the communication task COM/MBX, controlling the communication between the two processors, will be affected.

Both in the case of one and in the case of two processors the exchange of data between the data communication task and the sequential control task takes place via a memory MBX which can be addressed from both tasks. As is shown in the FIGS. 2a and 2b, the writing and reading from the memory MBX in the sequence control task takes place during a part of the cycle executed during this task. During a cycle, a given amount of time is allocated to each task in the sequence control.

Figure 3:
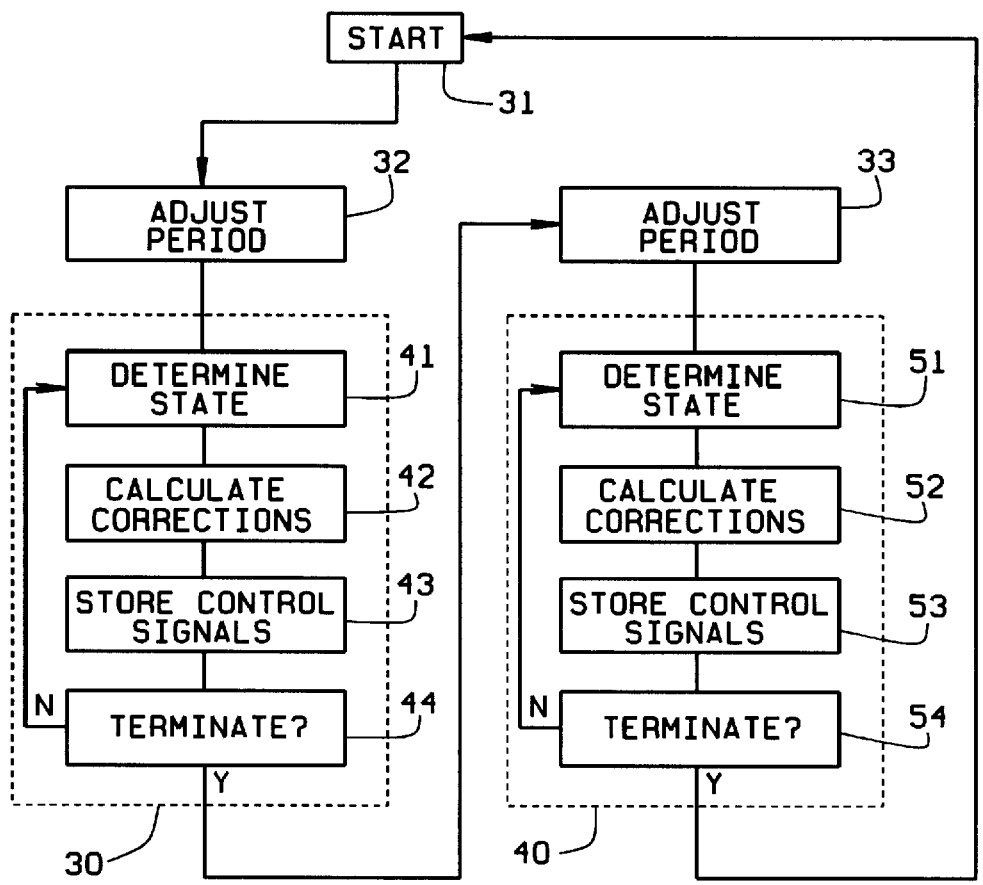
FIG. 3 shows a flow chart of an application program for a PLC in accordance with the invention.

FIG. 3 shows a flow chart of an application program for a programmable logic controller in accordance with the invention. The application program shown controls two phases of the operation of a machine or process. The first phase, indicated in section 30, is a time-critical phase, for example the filling and subsequent opening of the mould of an injection moulding machine. The second phase, denoted by the reference 40, is far less time-critical and in the case of an injection moulding machine it concerns, for example the removal of the workpiece and the closing of the mould. A further control task in which time-critical as well as less time-critical phases occur is the control of a numerically controlled milling machine or lathe. The phase during which a workpiece is actually being worked is substantially more time-critical than the displacement of tool or workpiece in free space or the exchange of a tool.

The program is started by a command, for example from a user console, thus fetching the necessary control parameters which indicate how the action is to be performed. Subsequently, the program starts first in the time-critical phase. In accordance with the invention first (in block 32) the period available to data communication will be adjusted to a very small value, for example 2 ms. Subsequently, the time-critical phase is executed, during which successively:

in block 41 the instantaneous state of the machine or the process is determined on the basis of the parameters entered during the input task of a PLC cycle;

in block 42 the necessary corrections are calculated;

in block 43 the necessary control signals are entered in the memory locations wherefrom they are applied to the actuators during the execution task of the PLC cycle; and finally in block 44 it is checked whether this first phase may be terminated. If not, this cycle within the user task is repeated; otherwise, the operation proceeds to the second phase. This phase consists of the same tasks, indicated by the blocks 51, 52, 53 and 54, respectively. However, this second phase 40 is preceded by a block 33 informing the firmware program that the data communication phase of a PLC cycle must be long, for example 10 or 20 ms. During this long phase large blocks of control parameters can be made available to the user task in one or only a few PLC cycles.

What is claimed is:

1. A programmable logic controller (PLC), comprising a processor comprising a sequential control processor unit and a data communication processor unit for communicating with at least one external system, said PLC arranged to execute tasks cyclically during sequential control, in each cycle a given period of time available to each task, said tasks comprising a user task for executing an application program and a communication task for exchanging, via a memory data between the sequential control processor unit and the data communication processor unit, the ratio of the durations of the periods available to the execution of the communication task and the application program adjustable during the execution of the application program based on data supplied to the sequential control processor unit in executing the communication task.

2. A programmable logic controller as claimed in claim 1, in which the duration of the period available to the communication task can be adjusted via the application program.

3. A programmable logic controller as claimed in claim 1, in which the period available to the communication task is adjustable within predetermined limits.

4. A programmable logic controller as claimed in claim 1, wherein said processor comprises a communication unit (MBX) for communication between the first and the second processor.

5. A programmable logic controller as claimed in claim 1, in which the external system whose control parameters acquired during the communication task originate from a user console and/or a programming system and/or another programmable logic controller and/or a central computer.

6. Apparatus comprising a central processing unit, said central processing unit comprising a sequential control processor for sequentially executing tasks and a data communication processor for communicating with at least one external system, said tasks executed by said sequential control processor comprising a user task for executing an application program and a communication task for exchanging, via a memory, data between said sequential control processor unit and said data communication processor unit, a ratio of a time period available for execution of said communication task and an application program adjustable based on data supplied to said sequential control processor in executing said communication task.

7. Apparatus in accordance with claim 6 further comprising a communication unit for controlling communication between said sequential control processor and said data communication processor.

8. Apparatus in accordance with claim 6 further comprising an interface module coupled to said sequential control processor.

9. Apparatus in accordance with claim 8 further comprising a serial bus and at least one actuator and at least one sensor coupled to said serial bus, said interface module coupled to said serial bus.

10. Apparatus in accordance with claim 6 wherein said external system comprises at least one of a network, a computer, and a user console.

11. Apparatus in accordance with claim 6 further comprising a look-up table designating an amount of time allocated for execution of a command.

12. Apparatus in accordance with claim 6 wherein a predesignated period of time is allocated for execution of each of said tasks.

13. Apparatus comprising a central processing unit, said central processing unit comprising a sequential control processor for sequentially executing tasks and a data communication processor for communicating with at least one external system, said tasks executed by said sequential control processor comprising a user task for executing an application program and a communication task for exchanging, via a communication unit, a predesignated period of time allocated for execution of each of said tasks, data between said sequential control processor unit and said data communication processor unit, a ratio of a time period available for execution of said communication task and an application program adjustable based on data supplied to said sequential control processor in executing said communication task, said apparatus further comprising a look-up table designating an amount of time allocated for execution of a command.

14. Apparatus in accordance with claim 13 further comprising an interface module coupled to said sequential control processor.

15. Apparatus in accordance with claim 14 further comprising a serial bus and at least one actuator and at least one sensor coupled to said serial bus, said interface module coupled to said serial bus.

16. Apparatus in accordance with claim 13 wherein said external system comprises at least one of a network, a computer, and a user console.

* * * * *